United States Patent
Seo et al.

(10) Patent No.: US 9,494,712 B2
(45) Date of Patent: Nov. 15, 2016

(54) RESIN COMPOSITION FOR OPTICAL FILM AND OPTICAL FILM USING THE SAME

(75) Inventors: Jae-Bum Seo, Daejeon (KR);
Chang-Hun Han, Daejeon (KR);
Dae-Woo Lee, Busan (KR); Jung-Tae Park, Yeosu-si (KR); Eun-Jung Choi, Daejeon (KR); Byoung-Il Kang, Daejeon (KR); Joon-Sik Kim, Yeosu-si (KR); Su-Kyung Kim, Daejeon (KR); Da-Eun Sung, Daejeon (KR); Nam-Jeong Lee, Daejeon (KR); Beom-Suk Kim, Daejeon (KR); Yu-Taek Sung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 203 days.

(21) Appl. No.: 13/989,377

(22) PCT Filed: Jan. 30, 2012

(86) PCT No.: PCT/KR2012/000667
§ 371 (c)(1),
(2), (4) Date: Oct. 18, 2013

(87) PCT Pub. No.: WO2012/141413
PCT Pub. Date: Oct. 18, 2012

(65) Prior Publication Data
US 2014/0036363 A1    Feb. 6, 2014

(30) Foreign Application Priority Data

Apr. 13, 2011  (KR) .................. 10-2011-0034441
Aug. 26, 2011  (KR) .................. 10-2011-0085942

(51) Int. Cl.
| | | |
|---|---|---|
| C08F 222/04 | (2006.01) | |
| C08F 222/10 | (2006.01) | |
| G02B 1/04 | (2006.01) | |
| G02B 5/30 | (2006.01) | |

(52) U.S. Cl.
CPC .............. *G02B 1/04* (2013.01); *G02B 5/3083* (2013.01)

(58) Field of Classification Search
None
See application file for complete search history.

(56) References Cited

U.S. PATENT DOCUMENTS

| | | | |
|---|---|---|---|
| 4,874,824 A | 10/1989 | Hallden-Abberton et al. | |
| 2009/0275718 A1* | 11/2009 | Um ........................ | C08J 5/18 526/262 |
| 2011/0009585 A1* | 1/2011 | Yonemura ............. | C08F 220/14 526/269 |
| 2011/0130535 A1* | 6/2011 | Yonemura ............. | C08F 220/14 526/272 |

FOREIGN PATENT DOCUMENTS

| | | |
|---|---|---|
| EP | 0-264-508 | 9/1991 |
| KR | 10-2008-0062470 | 7/2008 |
| KR | 10-2010-0104518 | 9/2010 |
| WO | 2009/084541 | 7/2009 |
| WO | 2010013557 A1 | 4/2010 |

OTHER PUBLICATIONS

Machine translation of KR 10-2010-0104518 A to Kang et al.*

* cited by examiner

*Primary Examiner* — Vu A Nguyen
(74) *Attorney, Agent, or Firm* — Dentons US LLP

(57) ABSTRACT

Provided are a resin composition for an optical film including an alkyl(meth)acrylate unit, a benzyl(meth)acrylate unit, a (meth)acrylic acid unit, and a unit expressed by Chemical Formula I, an optical film, a polarizing plate, and an image display device using the resin composition.

12 Claims, No Drawings

RESIN COMPOSITION FOR OPTICAL FILM AND OPTICAL FILM USING THE SAME

This application is a National Stage Entry of International Application No. PCT/KR2012/000667, filed Jan. 30, 2012, and claims the benefit of Korean Application Nos. 10-2011-0034441 filed on Apr. 13, 2011 and 10-2011-0085942, filed Aug. 26, 2011, all of which are hereby incorporated by reference in their entirety for all purposes as if fully set forth herein.

TECHNICAL FIELD

The present invention relates to a resin composition for an optical film and an optical film using the same, and more particularly, to a resin composition for an optical film having excellent heat resistance and optical properties as well as having a low thermal expansion coefficient and an optical film using the resin composition.

BACKGROUND ART

In line with recent advancements in optical technology, various display technologies replacing a conventional cathode ray tube (CRT), such as a plasma display (PDP), a liquid crystal display (LCD), and an organic electroluminescent display (OELD), have been developed and are commercially available. Meanwhile, various polymer films such as a polarizing film, a polarizer protective film, a retardation film, a light guide plate, and a plastic substrate have been used for such display devices and there is a trend for the use of such polymer materials in a display device of which required characteristics have become highly advanced.

Currently, the most widely used polymer film for a display is a triacetyl cellulose (TAC) film which is used for a polarizing plate protective film or the like. However, the TAC film may have a limitation in that the polarizability thereof may decrease, a polarizer and the film may be separated or optical properties thereof may deteriorate when the TAC film is used over a prolonged period of time in a high-temperature or high-humidity environment. In order to resolve the foregoing limitation, a polystyrene-based polymer film, an acryl-based polymer film, such as methyl methacrylate, or a polycarbonate-based polymer film are suggested as alternatives to the TAC film. The foregoing polymer films may have excellent heat resistance. However, with respect to the polystyrene or polycarbonate film, birefringence may be generated during film alignment, thereby adversely affecting optical properties, because the polystyrene or polycarbonate film has an aromatic ring in the polymer, and with respect to the methyl methacrylate, a retardation value thereof is relatively small in comparison to the polystyrene or polycarbonate but the methyl methacrylate is insufficient to be used for a material for an optical device such as a liquid crystal device requiring high precision.

In order to address such limitations, a method of copolymerizing or blending a monomer or a polymer having positive birefringence with a monomer or a polymer having negative birefringence was suggested for a material for a polymer film having a low retardation value, as well as excellent heat resistance. A typical material according to the foregoing method may be a copolymer of benzyl methacrylate and methyl methacrylate. The benzyl methacrylate and methyl methacrylate have excellent optical properties because their retardation values approach zero. However, there is a limitation in that a curling phenomenon may be generated, in which a polarizing plate is severely bent or distorted when a polarizing film and a TAC film are laminated together, because the thermal expansion coefficients of the benzyl methacrylate and methyl methacrylate are both higher than that of the TAC film used for a polarizing plate protective film. When the foregoing curling phenomenon occurs in a polarizing plate, display quality deteriorates due to the occurrence of a light-leakage phenomenon in the polarizing plate and liquid crystals in a display panel may also be damaged. Therefore, urgent improvements to rectify the foregoing limitations are required.

DISCLOSURE OF INVENTION

Technical Problem

An aspect of the present invention provides a resin composition for an optical film enabling an improvement of a curling phenomenon when applied to a polarizing plate due to excellent optical properties and heat resistance as well as a low thermal expansion coefficient and an optical film using the resin composition.

Solution to Problem

According to an aspect of the present invention, there is provided a resin composition for an optical film including: an alkyl(meth)acrylate unit; a benzyl(meth)acrylate unit; a (meth)acrylic acid unit; and a unit expressed by Chemical Formula I below,

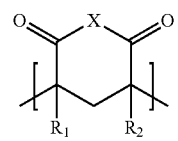

[Chemical Formula I]

where X is $NR_3$ or O, and $R_1$, $R_2$, and $R_3$ are hydrogen, $C_{1-10}$ alkyl and $C_{3-20}$ cycloalkyl or $C_{3-20}$ aryl, respectively.

According to another aspect of the present invention, there is provided an optical film including the resin composition for an optical film.

Advantageous Effects of Invention

An optical film using a resin composition for an optical film according to the present invention is suitable to be used as a polarizing plate protective film due to excellent transparency and heat resistance as well as a low thermal expansion coefficient.

BEST MODE FOR CARRYING OUT THE INVENTION

Hereinafter, the present invention is described in more detail.

The inventors of the present invention conducted a great deal of research to develop a resin composition for an optical film having a low thermal expansion coefficient as well as excellent optical properties and heat resistance, and, as a result, found that an optical film having a low thermal expansion coefficient as well as a small retardation value and a high glass transition temperature may be prepared when a four-component resin composition including an alkyl(meth)acrylate unit, a benzyl(meth)acrylate unit, (meth)acrylic acid unit, and a unit expressed by Chemical Formula I is used, and completed the present invention.

A resin composition for an optical film of the present invention includes an alkyl(meth)acrylate unit, a benzyl (meth)acrylate unit, (meth)acrylic acid unit, and a unit expressed by the following Chemical Formula I. At this time, the resin composition may be a copolymer resin, in which each unit is included in a repeating unit form, and a blended resin, in which monomers composed of each unit or homopolymers are blended, or a blended resin, in which two or more copolymers composed of two or more units are blended. Among the foregoing resin compositions, the resin composition, for example, may be a four-component copolymer resin in which the each unit component is included in a repeating unit form.

In the resin composition of the present invention, the alkyl(meth)acrylate unit denotes both alkyl acrylate and alkyl methacrylate. In consideration of optical transparency, compatibility, processability, and productivity, a carbon number of an alkyl group of the alkyl(meth)acrylate may be about 1 to 10, and for example, the carbon number may be about 1 to 4. For example, the alkyl group of the alkyl(meth) acrylate unit may be a methyl or an ethyl group. However, the alkyl(meth)acrylate unit is not limited thereto. Meanwhile, a content of the alkyl(meth)acrylate unit is about 55 to 94 parts by weight based on 100 parts by weight of a total resin composition, may be 60 to 90 parts by weight, and for example, may be 70 to 90 parts by weight. The reason for this is that excellent retardation characteristics and optical properties may be obtained when the content of the alkyl (meth)acrylate unit is within the foregoing ranges.

In the resin composition of the present invention, the benzyl(meth)acrylate unit provides an appropriate retardation value to the optical film of the present invention and compatibility between the alkyl(meth)acrylate and (meth) acrylic acid. The benzyl(meth)acrylate unit may be benzyl methacrylate or benzyl acrylate, and for example, may be benzyl methacrylate. Meanwhile, a content of the benzyl (meth)acrylate unit may be about 2 to 20 parts by weight based on 100 parts by weight of a total resin composition, and for example, may be 2 to 18 parts by weight. The reason for this is that desired retardation characteristics may be obtained when the content of the benzyl(meth)acrylate unit is within the foregoing ranges.

Meanwhile, in the resin composition of the present invention, the (meth)acrylic acid unit improves heat resistance and lowers a thermal expansion coefficient by introducing a polar group. Examples of the (meth)acrylic acid unit may be an acrylic acid, a methacrylic acid, a methylacrylic acid, a methyl methacrylic acid, an ethylacrylic acid, an ethyl methacrylic acid, a butylacrylic acid, or a butyl methacrylic acid. For example, the (meth)acrylic acid unit may be methacrylic acid. Meanwhile, a content of the (meth)acrylic acid unit is about 1 to 10 parts by weight based on 100 parts by weight of a total resin composition, may be 1 to 5 parts by weight, may be 1 to 3 parts by weight, and for example, may be 1 to 2 parts by weight. The reason for this is that desired heat resistance characteristics may be obtained when the content of the (meth)acrylic acid unit is in the foregoing ranges. In particular, there is an additional advantage in which the generation of bubbles may be significantly reduced in a film preparation process when the content of the (meth)acrylic acid is 2 parts by weight or less.

Also, the resin composition of the present invention includes a unit expressed by the following Chemical Formula I.

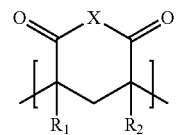

[Chemical Formula I]

Where X is $NR_3$ or O, and $R_1$, $R_2$, and $R_3$ are hydrogen, $C_{1-10}$ alkyl, $C_{3-20}$ cycloalkyl or $C_{3-20}$ aryl, respectively.

The unit expressed by the above Chemical Formula I is to reduce the thermal expansion coefficient of the resin composition. The thermal expansion coefficient of the polymer may be reduced when a bulky functional group preventing polymer chain conformation is introduced to a polymer main chain. Although the thermal expansion coefficient may be reduced when polymers including a bulky functional group, for example, when styrene or polycarbonate are used therefor, a limitation in optical properties may be generated because birefringence is manifested by stretching. However, the thermal expansion coefficient may be effectively reduced without adversely affecting the optical properties when a compound expressed by Chemical Formula I is used as in the present invention. Particular examples of the unit expressed by Chemical Formula I may be a glutaric acid anhydride, a glutaric acid imide and the like. For example, the unit expressed by Chemical Formula I may be a glutaric acid anhydride. Meanwhile, a content of the unit expressed by Chemical Formula I may be about 3 to 15 parts by weight based on 100 parts by weight of a total resin composition. A low thermal expansion coefficient may be obtained without deteriorating retardation characteristics when the content of the unit expressed by Chemical Formula I is within the foregoing range.

A glass transition temperature of the resin composition for an optical film of the present invention including the foregoing components is in a range of about 120° C. to 500° C., may be in a range of 125° C. to 500° C., and for example, may be in a range of 125° C. to 200° C. Also, in terms of processability, heat resistance, and productivity, a weight-average molecular weight may be in a range of 50,000 to 500,000, and for example, may be about 50,000 to 200,000. Transparency (haze) may be in a range of about 0.1% to 3% and a degree of light transmission may be 90% or more. Further, a yellow index value may be in a range of about 0.3 to 2.0. Display colors may be changed when the yellow index value is outside of the foregoing range.

Meanwhile, the foregoing resin composition of the present invention may be prepared according to a method of preparing a copolymer resin or a method of preparing a blended resin which is well known in the art. For example, monomers of each component may be mixed, and then the resin composition of the present invention may be formed by solution polymerization, bulk polymerization, suspension polymerization, emulsion polymerization, or may be prepared by blending monomers of each component or homopolymer resins or a copolymer resin of two or more components.

Meanwhile, as the result of a great deal of research, the present inventors found that the four-component resin composition of the present invention may be prepared through a specific method by polymerizing three components, i.e., alkyl(meth)acrylate, (meth)acrylic acid, and benzyl(meth) acrylate, without adding a component of Chemical Formula I when the component of Chemical Formula I of the resin composition according to the present invention is a glutaric acid anhydride.

More particularly, the resin composition of the present invention, for example, may be prepared by copolymerizing alkyl(meth)acrylate, (meth)acrylic acid, and benzyl(meth) acrylate in a continuous bulk polymerization method. With respect to the continuous bulk polymerization method, a large amount of heat is generated during a polymerization process different from the solution or suspension polymerization, and glutaric acid anhydride may be formed while a hydrolysis and condensation reaction between alkyl(meth) acrylate and/or benzyl(meth)acrylate and (meth)acrylic acid is performed according to the heat generated during the polymerization process.

Also, for example, alkyl(meth)acrylate, (meth)acrylic acid, and benzyl(meth)acrylate are polymerized by a suspension polymerization method, and then the resin composition of the present invention may be prepared by a heat treatment method. In this case, glutaric acid anhydride will be formed while a hydrolysis and condensation reaction between alkyl(meth)acrylate and/or benzyl(meth)acrylate and (meth)acrylic acid is performed during the heat treatment process, and as a result, the four-component resin composition of the present invention will be formed.

When the resin composition of the present invention is formed by a heat treatment after the foregoing continuous bulk polymerization method or suspension polymerization, the four-component resin composition of the present invention may be formed without adding a glutaric acid anhydride. Therefore, a higher quality film than that of a three-component resin including alkyl(meth)acrylate, benzyl (meth)acrylate, and (meth)acrylic acid may be formed, because preparation costs are low as well as a decrease in the thermal expansion coefficient of the resin composition by means of the formed glutaric acid anhydride.

Another aspect of the present invention relates to an optical film including the resin composition of the present invention.

The optical film may be prepared by forming the resin composition into a film shape according to a method well-known in the art such as solution casting or extrusion method. In consideration of economic factors, the extrusion method, for example, may be used. In some cases, an additive such as a conditioner may be additionally added within a range that will not deteriorate the physical properties of the film during a manufacturing process of the film and a uniaxial or biaxial stretching process may be additionally performed.

In the stretching process, machine direction (MD) stretching and transverse direction (TD) stretching may be respectively performed or may all be performed. Also, when the machine direction stretching and transverse direction stretching are all performed, any stretching is first performed and then the other stretching may be performed or both stretchings may be performed at the same time. Further, the stretchings may be performed in one operation and may also be performed through multiple operations. Stretching by means of the speed difference between rolls may be performed with respect to the machine direction stretching and a tenter may be used with respect to the transverse direction stretching. A rail start angle of the tenter is generally set to within 10 degrees to prevent a bowing phenomenon generated during a transverse direction stretching and regularly control an angle of an optical axis. The effect of preventing the bowing phenomenon may be obtained when the transverse direction stretching is performed through multiple operations.

Meanwhile, in the stretching process, when the glass transition temperature of the resin composition is referred to as 'Tg', the stretching may be performed at a temperature ranging from (Tg−20° C.)~(Tg+30° C.). The glass transition temperature refers to a temperature range starting from a temperature at which a storage modulus of the resin composition starts to be lowered so a loss modulus starts to be increased to be greater than the storage modulus to a temperature at which orientation of polymer chains is lessened to be lost. The glass transition temperature of the resin composition may be measured by a differential scanning calorimeter (DSC). The temperature during the stretching process may be, for example, the glass transition temperature of the resin composition.

A stretching operation may be performed at a stretching speed range of 1 m/min to 100 m/min with respect to a small stretching machine (universal testing machine, Zwick Z010) and may be performed at a stretching speed range of 0.1 m/min to 2 m/min with respect to a pilot stretching machine. A draw ratio may be in a range of about 5% to 300%.

Retardation characteristics of the film may be controlled through the foregoing stretching process.

Meanwhile, an optical film of the present invention prepared by the foregoing method has an in-plane retardation value ($R_{in}$) ranging from 0 nm to 10 nm and a thickness retardation value ($R_{th}$) ranging from about −5 nm to 10 nm at a wavelength of 580 nm. Herein, the in-plane retardation value denotes a value defined by the following Mathematical Equation 1 and the thickness retardation value denotes a value defined by the following Mathematical Equation 2.

$$R_{in}=(n_x-n_y)\times d \quad \text{[Mathematical Equation 1]}$$

$$R_{th}=(n_z-n_y)\times d \quad \text{[Mathematical Equation 2]}$$

where $n_x$ is an in-plane refractive index of the film in a direction having the largest refractive index, $n_y$ is an in-plane refractive index of the film in a direction perpendicular to the $n_x$ direction, $n_z$ is a thickness refractive index, and d is a thickness of the film.

Also, the optical film of the present invention has a thermal expansion coefficient in a range of about 50 ppm/K to 70 ppm/K and has a lower thermal expansion coefficient in comparison to a typical acryl-based film. Thus, since the thermal expansion coefficient is low, the occurrence of curling may be prevented when the optical film of the present invention is used for a polarizing plate.

Further, the optical film of the present invention has a thickness range of 20 μm to 200 μm, and may have a thickness range of 40 μm to 120 μm. Transparency is in a range of 0.1% to 3%, and the degree of light transmission may be 90% or more. The reason for this is that the optical film of the present invention is suitable to be used as a polarizing plate protective film when the thickness, transparency, and transmittance of the film are within the foregoing ranges.

Another aspect of the present invention relates to a polarizer and a polarizing plate including the optical film according to the present invention used as a protective film on at least one side of the polarizer. The optical film according to the present invention may be included on both sides of the polarizer or may only be included on one side. When the optical film according to the present invention is included on one side of the polarizer, a polarizer protective film well known in the art such as a triacetyl cellulose (TAC)

film, a polyethylene terephthalate (PET) film, a cyclo-olefin (COP) film, a polycarbonate (PC) film, or a norbonene-based film may be included on the other side. In consideration of economic factors, the TAC film, for example, may be included among the foregoing polarizer protective films. Since the optical film of the present invention has a thermal expansion coefficient similar to that of the TAC film, a curling phenomenon generated due to the difference in the thermal expansion coefficient may be minimized when the TAC film is adhered to one side of the polarizer and the optical film of the present invention is adhered to the other side.

Meanwhile, the adhesion between the polarizer and the optical film and/or the protective film of the present invention may be performed by a method in which an adhesive is coated on the film or a surface of the polarizer by using a roll coater, a gravure coater, a bar coater, a knife coater, or a capillary coater, and then the protective film and the polarizer are heated and laminated by a laminating roll or laminated by pressing at room temperature. Meanwhile, adhesives used in the art such as a polyvinyl alcohol-based adhesive, a polyurethane-based adhesive, or an acryl-based adhesive may be used without limit as the foregoing adhesive.

The polarizing plate of the present invention thus prepared may have a bending angle of 150 degrees or less after left standing at 25° C. and 50% RH for 24 hours, and for example, may have a bending angle in a range of about 120 degrees to 150 degrees. When the bending angle of the polarizing plate is more than 150 degrees, display quality may deteriorate due to the occurrence of severe curling in the polarizing plate. Herein, the bending angle denotes a central angle measured when the bent polarizing plate is regarded as a circular arc.

Another aspect of the present invention relates to an image display device including the polarizing plate of the present invention. At this time, the image display device, for example, may be a liquid crystal display (LCD), a plasma display (PDP), or electroluminescent display (ELD).

MODE FOR THE INVENTION

Hereinafter, the present invention will be described in detail according to specific examples. The following examples are merely provided to more clearly understand the present invention, not to limit the scope of the present invention.

A method of evaluating physical properties in the present invention is as below.

1. Weight-Average Molecular Weight: the prepared resin was dissolved in tetrahydrofuran and measured by using gel permeation chromatography (GPC).

2. Glass Transition Temperature (Tg): measured by using a differential scanning calorimeter (DSC) of TA instruments.

3. Haze and Light Transmittance: measured according to an ASTM 1003 method.

4. Toughness: a state of disconnection was measured by bending a 60 μm thick film by hand, and a case of no disconnection during 10 bends was denoted by ⊚, a case of 1 to 3 disconnections was denoted by ◯, and a case of 5 or more disconnections was denoted by X.

5. Coefficient of Thermal Expansion (CTE): measured by using a Pyris 6 DSC of Perkin Elmer Inc.

6. Retardation: measured by using an Elli-SE of Ellipso Technology.

7. Resin Composition: measured by using a C13-NMR

8. Yellow Index (YI): measured by using a color meter of Hunter Associates Laboratory, Inc.

9. Curling Characteristics: products after being laminated with a polarizing plate were stored in a constant temperature and humidity chamber (25° C., 50% RH) for 24 hours, and then curvatures of the polarizing plates were measured.

Examples 1 to 7

A methyl methacrylate monomer, a methacrylic acid monomer, and a benzyl methacrylate monomer are mixed in a toluene polymerization solvent according to the contents described in the following Table 1, and a polymerization solution was prepared by introducing 0.03 parts by weight of a dicumyl peroxide initiator, 0.5 parts by weight of a t-dodecyl mercaptan chain transfer agent, and 0.2 parts by weight of an Iraganox 245 antioxidant into the mixed solution. Thereafter, a resin including a methyl methacrylate unit, a methacrylic acid unit, a benzyl methacrylate unit, and a glutaric acid anhydride unit according to the contents described in Table 1 was prepared by continuous bulk polymerization. The composition, weight-average molecular weight, glass transition temperature, haze, light transmittance, and yellow index of the prepared resin were measured. The measurement results are shown in Table 1.

Next, a 180 μm thick film was prepared from the resin by using a T-die extruder and a 60 μm thick film was prepared through biaxially stretching the 180 μm thick film two times in a machine direction (MD) and three times in a transverse direction (TD). The retardation value, toughness, and thermal expansion coefficient of the prepared optical film were measured. The measurement results are shown in Table 1.

The optical film and TAC film (Fuji Film) were adhered to each side of a PVA film to prepare a polarizing plate, and then curling characteristics were measured. The measurement results are shown in Table 1.

TABLE 1

| Category | | Example 1 | Example 2 | Example 3 | Example 4 | Example 5 | Example 6 | Example 7 |
|---|---|---|---|---|---|---|---|---|
| Polymerization solution | BzMA | 3 | 8 | 15 | 8 | 8 | 8 | 8 |
| | MMA | 85 | 80 | 73 | 87 | 74 | 80 | 80 |
| | MAA | 12 | 12 | 12 | 5 | 18 | 12 | 12 |
| Resin composition | BzMA | 3.2 | 8.1 | 15.2 | 8.2 | 8.1 | 8.2 | 8.1 |
| | MMA | 85.4 | 80.1 | 72.9 | 87.3 | 74.1 | 80.3 | 79.8 |
| | MAA | 2.5 | 2.3 | 2.4 | 1.4 | 3.6 | 1.7 | 2.9 |
| | G/A | 8.9 | 9.5 | 9.5 | 3.1 | 14.2 | 9.8 | 9.2 |
| Physical properties of resin | Weight-average molecular weight | 101,000 | 112,000 | 94,000 | 123,000 | 83,000 | 115,000 | 114,000 |
| | Tg (° C.) | 128 | 125 | 123 | 121 | 136 | 124 | 125 |
| | Haze | 0.2 | 0.3 | 0.2 | 0.2 | 0.4 | 0.2 | 0.3 |
| | YI | 0.6 | 0.7 | 0.8 | 0.5 | 0.9 | 1.1 | 0.4 |

TABLE 1-continued

| Category | | Example 1 | Example 2 | Example 3 | Example 4 | Example 5 | Example 6 | Example 7 |
|---|---|---|---|---|---|---|---|---|
| | Optical transmittance (%) | 93.2 | 92.4 | 92.1 | 93.3 | 92.1 | 92.6 | 92.5 |
| Physical properties of film | Rin/Rth | 0.3/−0.1 | 0.6/−0.8 | 1.1/−3.5 | 1.4/−1.3 | 3.1/−2.5 | 1.4/−0.4 | 0.9/0.3 |
| | Toughness | ◎ | ◎ | ○ | ◎ | ○ | ◎ | ◎ |
| | CTE (ppm/° C.) | 59 | 58 | 58 | 63 | 53 | 56 | 59 |
| Physical properties of polarizing plate | Curling properties | 134 | 133 | 136 | 148 | 125 | 131 | 139 |

BzMA: Benzyl methacrylate
MMA: Methyl methacrylate
MAA: Methacrylic acid
G/A: Glutaric acid anhydride
YI: Yellow index
CTE: Coefficient of thermal expansion Comparative Examples 1 to 6

Resin composition, optical film, and polarizing plate were respectively prepared in the same manner as Examples 1 to 7 except that a methyl methacrylate monomer, a methacrylic acid monomer, and a benzyl methacrylate monomer were mixed according to the contents described in the following Table 2. The composition, weight-average molecular weight, glass transition temperature, haze, light transmittance, and yellow index of the prepared resin were measured by the same methods as those of Examples 1 to 7 and are shown in Table 2. Also, the retardation value, toughness, and thermal expansion coefficient of the prepared optical film were measured by the same methods as those of Examples 1 to 7 and are shown in Table 2.

contents described in the following Table 3, and a polymerization solution was prepared by introducing 0.08 parts by weight of a t-hexyl peroxy-2-ethylhexanoate initiator, 0.2 parts by weight of a t-dodecyl mercaptan chain transfer agent, and 0.1 parts by weight of NaCl into the mixed solution. The polymerization solution was suspension polymerized at a first reaction temperature described in Table 3 for two hours and the temperature was increased to a second reaction temperature described in Table 3 to perform polymerization for one hour, and then the polymerized solution was cleaned and dried to prepare methyl methacrylate-benzyl methacrylate-methacrylic acid beads. The prepared beads were extruded at 270° C. through a co-rotating twin screw extruder to prepare a resin in a pellet state. The composition, weight-average molecular weight,

TABLE 2

| Category | | Comparative Example 1 | Comparative Example 2 | Comparative Example 3 | Comparative Example 4 | Comparative Example 5 | Comparative Example 6 |
|---|---|---|---|---|---|---|---|
| Polymerization solution | BzMA | 0 | 20 | 8 | 8 | 8 | 8 |
| | MMA | 88 | 68 | 92 | 67 | 80 | 80 |
| | MAA | 12 | 12 | 0 | 25 | 12 | 12 |
| Resin composition | BzMA | 0 | 21.1 | 8.1 | 7.8 | 8.1 | 8.2 |
| | MMA | 87.5 | 67.3 | 91.9 | 67.3 | 80.2 | 80.4 |
| | MAA | 2.3 | 2.1 | 0 | 5.6 | 9.8 | 8.5 |
| | G/A | 10.2 | 9.5 | 0 | 19.2 | 1.9 | 2.9 |
| Physical properties of resin | Weight-average molecular weight | 109,000 | 101,000 | 124,000 | 67,000 | 113,000 | 109,000 |
| | Tg (° C.) | 130 | 118 | 104 | 139 | 110 | 109 |
| | Haze | 0.2 | 0.3 | 0.2 | 3.3 | 1.8 | 2.3 |
| | YI | 0 | 0.7 | 0.8 | 1.0 | 0.4 | 0.5 |
| | Optical transmittance (%) | 93.2 | 92.3 | 92.2 | 89.1 | 89.9 | 89.9 |
| Physical properties of film | Rin/Rth | 11.6/13.5 | 8.7/−15.3 | 1.0/1.6 | 5.9/−7.3 | 1.2/−1.4 | 0.1/1.3 |
| | Toughness | ○ | ◎ | ○ | X | ◎ | ◎ |
| | CTE (ppm/° C.) | 52 | 57 | 85 | 49 | 78 | 74 |

BzMA: Benzyl methacrylate
MMA: Methyl methacrylate
MAA: Methacrylic acid
G/A: Glutaric acid anhydride
YI: Yellow index
CTE: Coefficient of thermal expansion Example 8 to 14

A methyl methacrylate monomer, a methacrylic acid monomer, and a benzyl methacrylate monomer were mixed in 0.05 parts by weight of a 5% polyvinyl alcohol aqueous solution and 200 parts by weight of water according to the glass transition temperature, haze, and light transmittance of the prepared resin were measured. The measurement results are shown in Table 3.

Next, a 180 μm thick film was prepared from the resin by using a T-die extruder and a 60 μm thick film was prepared through biaxially stretching the 180 μm thick film two times in a machine direction (MD) and three times in a transverse direction (TD). The retardation value, toughness, and thermal expansion coefficient of the prepared optical film were measured. The measurement results are shown in Table 3.

were mixed according to the contents described in the following Table 4. The composition, weight-average molecular weight, glass transition temperature, haze, and light transmittance of the prepared resin were measured by

TABLE 3

| Category | | Example 8 | Example 9 | Example 10 | Example 11 | Example 12 | Example 13 | Example 14 |
|---|---|---|---|---|---|---|---|---|
| Polymerization solution | BzMA | 5 | 5 | 10 | 10 | 8 | 8 | 10 |
| | MMA | 85 | 85 | 82 | 82 | 77 | 82 | 78 |
| | MAA | 10 | 10 | 8 | 8 | 15 | 10 | 12 |
| Reaction Temperature ($1^{st}/2^{nd}$ ° C.) | | 80/95 | 80/95 | 80/95 | 80/95 | 90/90 | 80/95 | 90/95 |
| Extrusion Temperature (° C.) | | 270 | 270 | 270 | 270 | 270 | 270 | 270 |
| Extrusion Number of Times | | 2 | 3 | 2 | 3 | 2 | 2 | 2 |
| Degree of vacuum (Torr) | | 20 | 20 | 20 | 20 | 20 | 20 | 20 |
| Final Resin composition | BzMA | 6 | 6.1 | 10.2 | 10.2 | 8.4 | 8.3 | 10.1 |
| | MMA | 84.2 | 84.2 | 81.7 | 81.5 | 77.5 | 81.7 | 78.2 |
| | MAA | 2.2 | 1.2 | 1.6 | 1.1 | 2.8 | 1.7 | 2.0 |
| | G/A | 7.6 | 8.5 | 8.5 | 7.2 | 11.3 | 8.3 | 9.7 |
| Physical properties of resin | Mw | 120,000 | 118,000 | 130,000 | 129,000 | 103,000 | 122,000 | 115,000 |
| | Tg (° C.) | 128 | 129 | 123 | 124 | 129 | 124 | 128 |
| | Haze | 0.2 | 0.2 | 0.1 | 0.2 | 0.3 | 0.2 | 0.2 |
| | Optical transmittance (%) | 93.4 | 93.3 | 92.7 | 92.6 | 92.1 | 93.2 | 92.2 |
| Physical properties of film | Rin/Rth | 0.3/−0.1 | 0.3/−0.2 | 0.7/−0.9 | 0.7/1.0 | 2.2/−2.5 | 1.6/−0.7 | 1.1/0.1 |
| | Toughness | ◎ | ◎ | ◎ | ◎ | ○ | ◎ | ◎ |
| | CTE (ppm/° C.) | 58 | 55 | 62 | 59 | 51 | 58 | 54 |

BzMA: Benzyl methacrylate
MMA: Methyl methacrylate
MAA: Methacrylic acid
G/A: Glutaric acid anhydride
YI: Yellow index Comparative Examples 8 to 13

Resin composition, optical film, and polarizing plate were respectively prepared in the same manner as Examples 8 to 14 except that a methyl methacrylate monomer, a methacrylic acid monomer, and a benzyl methacrylate monomer the same methods as those of Examples 8 to 14 and are shown in Table 4. Also, the retardation value, toughness, and thermal expansion coefficient of the prepared optical film were measured by the same methods as those of Examples 8 to 14 and are shown in Table 4.

TABLE 4

| Category | | Comparative Example 8 | Comparative Example 9 | Comparative Example 10 | Comparative Example 11 | Comparative Example 12 | Comparative Example 13 |
|---|---|---|---|---|---|---|---|
| Polymerization solution | BzMA | 0 | 5 | 5 | 5 | 8 | 10 |
| | MMA | 90 | 85 | 85 | 85 | 77 | 90 |
| | MAA | 10 | 10 | 10 | 10 | 15 | 0 |
| Reaction Temperature ($1^{st}/2^{nd}$ ° C.) | | 80/95 | 80/95 | 80/95 | 80/95 | 90/90 | 80/95 |
| Extrusion Temperature (° C.) | | 270 | X | 200 | 250 | X | 270 |
| Extrusion Number of Times | | 2 | X | 3 | 1 | X | 2 |
| Degree of vacuum (Torr) | | 20 | X | 20 | 20 | X | 20 |
| Final Resin composition | BzMA | 0 | 5.9 | 5.8 | 5.9 | 8.3 | 10.2 |
| | MMA | 90.3 | 84.4 | 84.5 | 84.5 | 77.5 | 88.7 |
| | MAA | 1.8 | 9.7 | 7.5 | 7.3 | 14.2 | 0 |
| | G/A | 7.9 | 0 | 2.2 | 2.3 | 0 | 1.1 |
| Physical properties of resin | Mw | 130,000 | 122,000 | 121,000 | 12,000 | 106,000 | 123,000 |
| | Tg (° C.) | 130 | 124 | 125 | 125 | 125 | 103 |
| | Haze | 0.2 | 0.3 | 0.2 | 0.2 | 0.4 | 0.2 |
| | Optical transmittance (%) | 93.3 | 93.1 | 93.1 | 92.9 | 91.3 | 92.1 |
| Physical properties of film | Rin/Rth | 10.9/13.1 | 0.4/0.2 | 0.3/0.1 | 0.3/0.1 | 2.0/−2.1 | 1.1/1.3 |
| | Toughness | ○ | ◎ | ◎ | ◎ | ◎ | ○ |
| | CTE (ppm/° C.) | 57 | 82 | 78 | 76 | 77 | 81 |

BzMA: Benzyl methacrylate
MMA: Methyl methacrylate
MAA: Methacrylic acid
G/A: Glutaric acid anhydride
YI: Yellow index While the present invention has been shown and described in connection with the exemplary embodiments, it will be apparent to those skilled in the art that modifications and variations can be made without departing from the spirit and scope of the invention as defined by the appended claims.

The invention claimed is:

1. A resin composition for an optical film comprising:
about 55 to 94 parts by weight of the methyl methacrylate unit;
about 2 to 20 parts by weight of the benzyl methacrylate unit;
about 1 to 10 parts by weight of the methacrylic acid unit; and
about 3 to 15 parts by weight of the glutaric acid anhydride unit,
wherein the resin composition is a four-component copolymer resin in which each unit component is included in a repeating unit form, and
wherein the resin composition for an optical film has a yellow index range of about 0.3 to about 2.0.

2. The resin composition for an optical film of claim 1, wherein a content of the methacrylic acid unit is in a range of about 1 to 2 parts by weight.

3. The resin composition for an optical film of claim 1, wherein the resin composition for an optical film has a glass transition temperature range of about 120° C. to about 500° C.

4. The resin composition for an optical film of claim 1, wherein the resin composition for an optical film has a transparency range of about 0.1% to about 3%.

5. An optical film comprising the resin composition for an optical film of claim 1.

6. The optical film of claim 5, wherein the optical film has an in-plane retardation value ($R_{in}$) expressed by the following Mathematical Equation 1 ranging from about 0 nm to about 10 nm and a thickness retardation value $R_{th}$ expressed by the following Mathematical Equation 2 ranging from about −5 nm to about 10 nm at a wavelength of about 580 nm, $$R_{in}=(n_x-n_y)\times d \qquad \text{[Mathematical Equation 1]}$$

$$R_{th}=(n_z-n_y)\times d \qquad \text{[Mathematical Equation 2]}$$

where $n_x$ is an in-plane refractive index of the film in a direction having a largest refractive index, $n_y$ is an in-plane refractive index of the film in a direction perpendicular to the $n_x$ direction, $n_z$ is a thickness refractive index, and d is a thickness of the film.

7. The optical film of claim 2, wherein the optical film has a thermal expansion coefficient range of about 50 ppm/° C. to 70 ppm/° C.

8. The optical film of claim 5, wherein the optical film has an in-plane retardation value ($R_{in}$) expressed by the following Mathematical Equation 1 ranging from about 0 nm to about 10 nm, a thickness retardation value ($R_{th}$) expressed by the following Mathematical Equation 2 ranging from about −5 nm to about 10 nm at a wavelength of about 580 nm, and a thermal expansion coefficient range of about 50 ppm/° C. to 70 ppm/° C., $$R_{in}=(n_x-n_y)\times d \qquad \text{[Mathematical Equation 1]}$$

$$R_{th}=(n_z-n_y)\times d \qquad \text{[Mathematical Equation 2]}$$

where $n_x$ is an in-plane refractive index of the film in a direction having a largest refractive index, $n_y$ is an in-plane refractive index of the film in a direction perpendicular to the $n_x$ direction, $n_z$ is a thickness refractive index, and d is a thickness of the film.

9. The optical film of claim 5, wherein the optical film is a polarizing plate protective film.

10. A polarizing plate comprising:
a polarizer; and
the optical film of claim 6 adhered to at least one side of the polarizer.

11. A polarizing plate comprising:
the optical film of claim 5,
wherein a bending angle of the polarizing plate is about 150 degrees or less after left standing at 25° C. and 50% RH for 24 hours.

12. An image display device comprising the optical film of claim 5.

* * * * *